April 21, 1925.

O. D. HOGUE 1,534,388

ELECTRICALLY HEATED HUMIDIFYING APPARATUS

Filed May 9, 1922    2 Sheets-Sheet 1

Inventor:
Oliver D. Hogue,
by James R. Hodder
atty.

April 21, 1925.                                                     1,534,388
O. D. HOGUE
ELECTRICALLY HEATED HUMIDIFYING APPARATUS
Filed May 9, 1922         2 Sheets-Sheet 2

Inventor
Oliver D. Hogue
by James R. Hodder
Atty.

Patented Apr. 21, 1925.

1,534,388

UNITED STATES PATENT OFFICE.

OLIVER D. HOGUE, OF BROOKLINE, MASSACHUSETTS.

ELECTRICALLY-HEATED HUMIDIFYING APPARATUS.

Application filed May 9, 1922. Serial No. 559,668.

*To all whom it may concern:*

Be it known that I, OLIVER D. HOGUE, a citizen of the United States, and resident of Brookline, in the county of Norfolk and State of Massachusetts, have invented an Improvement in Electrically-Heated Humidifying Apparatus, of which the following description, in connection with the accompanying drawings, is a specification, like letters on the drawings representing like parts.

In my prior and copending application, Ser. No. 527,480, filed January 6, 1922, I have illustrated and claimed a humidifying unit or apparatus intended particularly for household and residential use and my present invention is an improved apparatus of the same type.

In the present invention I have devised a novel and improved form of humidifying apparatus which operates with a constant and maintained liquid level, in combination with a relatively large reservoir or source of liquid supply which operates by a vacuum or barometric feed. Important features in the present apparatus consist in having the same more compact, convenient and economical as well as in a more attractive form than formerly, and with extremely durable, strong and simple constructional features. The portability of the present apparatus is also important as it facilitates movement from room to room of a house, if desired, as well as trans-shipment in commerce.

My development of humidifying apparatus, particularly of the household type, for indoor use, has culminated in the present humidifying apparatus. By having a relatively large reservoir which can be easily removed, taken to a faucet, quickly filled and promptly replaced on the apparatus, where it will automatically be sealed and constitute a day's supply for the humidifier, and by supplying means which will automatically maintain exactly the level required in the vaporizing or heating portion, I have greatly improved this type of apparatus and rendered it suitable for household use by unskilled persons. Furthermore, I have so constructed and arranged the present humidifying apparatus that the automatic flow of liquid supply from the large reservoir to the intermediate passages maintaining the liquid level in the evaporating or vaporizing portion will be gradually, uniformly and proportionately fed without unduly disturbing the water level. This is of desirable importance as enabling me to maintain with considerable exactness a predetermined water level and position the heating element relative therewith and of proper extent to secure 100% efficiency thereof. Thus I am enabled to conserve the amount of electrical power for the heating element to a relatively fine adjustment. Furthermore, by so positioning and arranging the evaporating and vaporizing portion protecting it from loss of heat by radiation, a full efficiency of the heating element— which in this case is an electrical heating member as the positive vaporizing means— is secured.

A further feature in the present apparatus consists in the fact that I provide a plurality of exposed liquid surfaces, and preferably one of the liquid surfaces open to evaporation at normal temperatures is segregated from other liquid surfaces, which latter are intended to be under heat and artificial evaporating means. This arrangement results in a very high degree of efficiency in the vaporizing supply from a small and compact device, even one exposed liquid surface open to normal evaporation aiding and adding to the moisture supply obtained by the artificially heated or vaporizing portion of the apparatus. I believe that this feature is a distinct novelty and therefore is claimed broadly herein. This arrangement proves to be of special advantage in connection with my novel arrangement whereby a substantially predetermined constant level is supplied together with a large reservoir with an automatic intermittent liquid supply.

Additional desirable advantages in my present form consist in the extreme simplicity and cheapness of construction. Thus I am enabled to provide a simple casting for a base and main support, a vaporizing portion with means to apply and to remove an electrical heating cartridge, permitting ready renewal when desired, a suitable support or stand for the main reservoir with cooperating barometric feed means to facilitate the flowing of the liquid from the reservoir and without "bubbling" or surplus discharge which would distort the liquid level in the vaporizing portion, thus insuring maintenance of an almost exact predetermined water level. Additional means to prevent the bubbling or boiling over of the liquid in the vaporizing portion are also provided, together with heat insulating devices thereabout, to prevent any danger of injury from personal contact with the heating portion of the apparatus. Any suitable or desirable finish, nickel, silver, enamel or covering, can be applied, and the entire unit is so complete, compact and portable that it may be moved from place to place as desired, put on a shelf, under a stand or table, set on a radiator, window sill, or other convenient position.

In the present apparatus I have devised an improved feature which is automatic in its action and function as a safety factor, eliminating all danger in case the liquid supply is exhausted and obviating the necessity for automatic cut-outs, complex or expensive thermostatic arrangements or the like. It is most important in all electric heating apparatus to have a safety means which will eliminate the dangers from overheating, resulting fires, etc., and in my present invention I have provided for such safety feature. By so constructing and arranging the heating unit, and positioning it within the center of the evaporating chamber through which the liquid flows, surrounding the heating portion, I secure not only the benefit of great efficiency in the evaporating chamber, but also the safety feature just mentioned. The liquid supply flows freely to and around the heating element and in case of exhaustion of the liquid supply, a free flow and supply of air surrounding the heating element will ensue, thus automatically supplying a continuous column of air in place of the liquid and thereby insulating the heating element from the rest of the apparatus, carrying away the excess heat, preventing damage and eliminating danger of overheating irrespective of how long the heat supply may continue. Thus I eliminate shut-offs, thermostats, or the like, although it will be understood that such devices may be employed if desired, but as an important feature of the present invention is its simplicity, compactness, cheapness, and safety, I prefer to provide this automatic safety feature through its constructional arrangement rather than by additional mechanism. I find that my novel arrangement will permit a heating temperature in the cartridge unit as high as 1000° Fahrenheit without the slightest danger when the liquid has been entirely boiled away or evaporated.

In carrying out the present improved and preferred form of the invention, an additional feature consists in the fact that my apparatus as now constructed and as herein illustrated, eliminates all joints, packing for air-, steam-, or water-tight flow, threaded connections or the like. The advantages of these features will be readily appreciated when it is realized that the entire apparatus can be manufactured without expensive processes, machining, fittings or the like, and can be assembled quickly and accurately and independently of skilled labor. Furthermore, the replenishing or filling of the supply reservoir and the operation of applying and connecting it to the entire apparatus, is effected by the simple movement of positioning the same in its supports and the liquid flows therefrom to supply the predetermined water level without couplings or any other fastenings, connections or the like, the entire process effecting an automatic air-tight sealing of the connecting means from the reservoir to the rest of the apparatus. Thus I eliminate the necessity for gaskets, air-tight caps, connections or other devices which would otherwise be necessary in order to effectually cause the apparatus to function by a barometric feed.

Further important advantages and features will be hereinafter more fully pointed out and claimed.

Referring to the drawings, illustrating a preferred embodiment of my present invention,—

Figure 4:
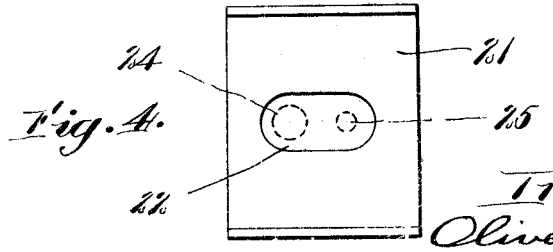

Fig. 4 being a fragmentary detailed cross-sectional view.

My present type of humidifying unit can be of any suitable size or capacity, dependent upon the work to be performed and the cubic contents of a room, house or building to be treated.

As illustrated in the drawings, a convenient sized apparatus is approximately ten inches square and twelve inches high, which will provide an ample capacity for an entire day's use in a building, residence or rooms of from 5,000 to 7,500 cubic feet capacity. The unit comprises a base 1 which may be stamped or cast out of any desired metal, preferably non-corrosive, said base having legs 2 and 3, formed as flanges if desired, and being provided with openings cored through upstanding bosses 5 and 6 substantially at opposite ends of the device, these being connected by a cored passageway 10.

Figure 3:
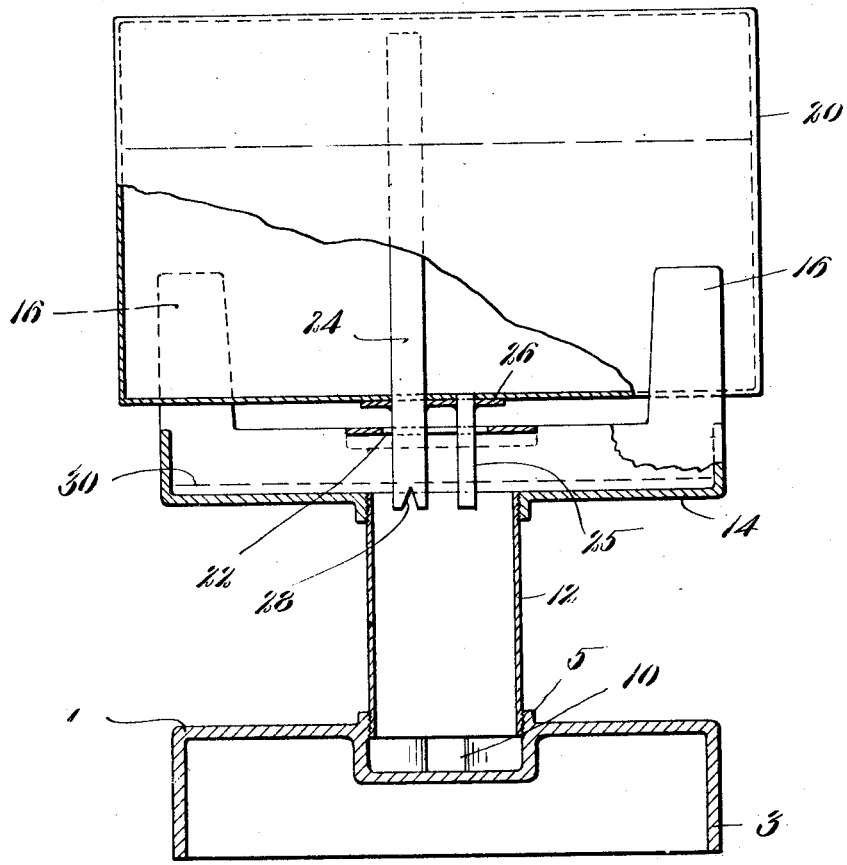
Fig. 3 is an end view at right angles to that illustrated in Fig. 1, and partly in cross-section.

The opening through the boss or rim 5 may be and preferably is threaded to receive the correspondingly threaded end of an upstanding circular hollow support 12, said support having attached to its upper end a pan-shaped member 14 secured to the support 12 by a water-tight joint, said member 14 being of a length substantially equal to the width of the base, and with upstanding flared arms 16, 16, at each end, of suitable strength and form to receive and hold the reservoir 20. This member 14 in connection with the hollow support 12 constitutes an auxiliary reservoir as well as a liquid receiving and level maintaining intermediate supply of liquid from the large reservoir 20 to the vaporizing portion. The member 14 is partially closed on this topmost surface by a plate 21, said plate having an aperture 22 therethrough to receive the projecting tubes 24 and 25 carried by the reservoir 20. These tubes 24 and 25 project from the reservoir 20 to an equal extent and have their respective open mouths in the same alinement, one tube 25 opening directly into the bottom of the reservoir 20 and the other tube 24 extending substantially through the interior of the reservoir 20 and opening adjacent the opposite or top wall as shown in the drawings. A strengthening plate 26 may be provided where these tubes pass through the reservoir, which also affords a firm bearing therefor. Preferably the reservoir 20 is cylindrical in form and shape for ease in manufacturing the same water- and air-tight, providing greatest capacity for amount of material used and also for appearance. Preferably I form in the larger tube 24 a V-shaped slot 28—see Fig. 3—to facilitate an even flow of air through the tube 24 when the water level 30 uncovers the apex of the slot 28, and thus permit an even discharge of liquid within the reservoir 20 through the pipe 25 into the liquid contained in the pan-shaped member 14, open support 12, passage 10, and in the vaporizing chamber, where of course the water will be at the same level, as indicated at 30, 30.

Figure 1:
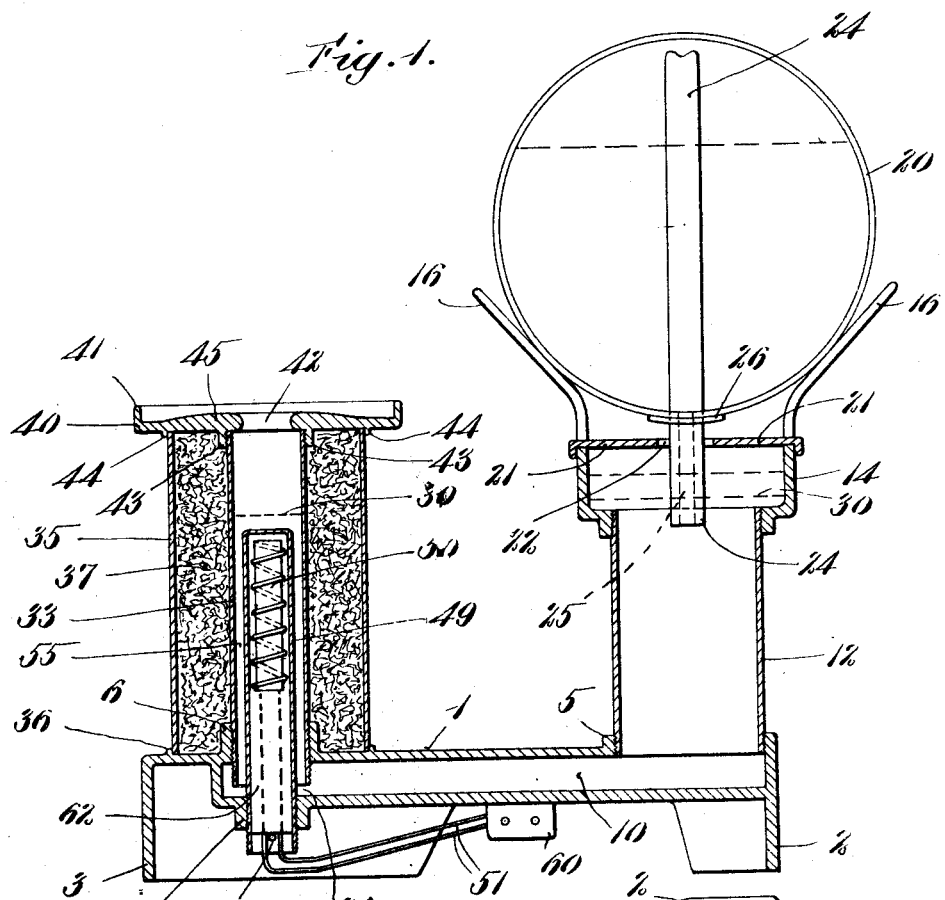
Fig. 1 is a side view, partly in cross-section, illustrative of my present humidifying unit.
Figure 2:
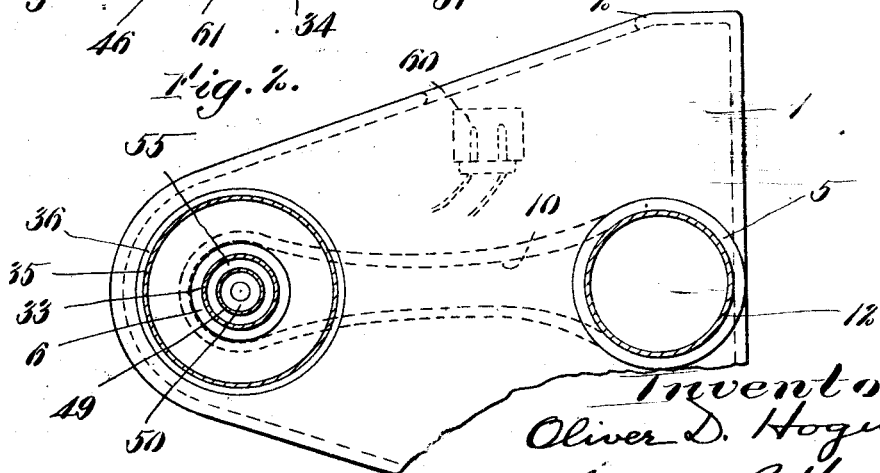
Fig. 2 is a fragmentary plan view, also partly in cross-section.

The opening 6 at the other end of the base 1 and in communication with the passage 10 affords a bearing for a tube 33, the latter extending into the passage 10 and leaving an annular opening therearound the same, as indicated at 34. This permits a free flow either of water or of air in case the water supply is exhausted or discontinued, providing the safety feature against overheating, as above noted. Surrounding the tube 33 is a larger tube 35, which may be conveniently held in position by fitting within an annular rib 36 formed in the top of the base 1, as clearly illustrated in Figs. 1 and 2. These two tubes leave an insulating space filled with felt 37, between them, which is intended for heat insulation, as will be more fully explained. Uniting the open tops of the concentric tubes 33 and 35 is a splash cup 40, of novel form and utility having an upstanding rim or flange 41 around the top, a central opening 42 and concentric depending ribs or flanges 43 and 44 of suitable extent and position to cooperate with and retain the tops of the tubes 33 and 35 respectively. This splash cup 40 is further formed with a higher central annular portion 45 so that all excess liquid which may bubble, boil, or flow out of the opening 42 will not run back into the evaporating chamber, but will find its way outwardly to the rim 41. This feature is of still further importance accelerating the evaporating capacity of the heating unit for the amount of current supplied.

Preferably the central opening 42 is of slightly less diameter than that of the interior of the tube 33 to prevent undue bubbling or boiling up of the liquid contained within the tube 33. Fitted within said tube 33 and through a threaded hub or flange 46 in the base, opening through the cored passage 10 and concentric with said tubes 33 and 34 is fitted a closed tubular member 49, extending upwardly in said tube 33 to a level slightly below the liquid level 30 therein, said tube being adapted to contain and hold an electrical heating unit or cartridge 50. This cartridge 50 may be slipped within the tube 49, without disturbing the liquid contained herein, from underneath the base, and the current carrying wires 51 are led therefrom to a connecting plug 60 where it can be connected by supply wires to any electric light socket in the baseboard, wall bracket, or other convenient location. This tube 49 is of slightly less diameter exteriorly than that of the interior of the tube 33, thereby leaving an annular space 55 around the same, which opens through the recess 34 into the cored opening 10. Consequently, liquid received into the member 14 and support 12 will flow through the passage 10 and upwardly in the space 55 to an equal level 30, 30, in each part. Liquid being supplied and current turned on to the heater 50, creates a positive vaporizing or evaporating chamber, quickly heating and causing steam to generate from the thin volume of liquid around and slightly above the top of the cartridge 50 and the tube containing and protecting the same. Thus a positive vaporizing device is created and it is almost instantly effective, because of the relatively slight amount of water to be heated by the heating cartridge 50. This feature enables me to employ a heating cartridge 50 of most economical power and yet of full efficiency, this feature being further emphasized by the insulation afforded with the surrounding tube 35 and the intermediate air space 37, filled with wool felt, thereby conserving almost the entire heat of the cartridge unit to evaporate the liquid.

In order to maintain the supply at constant level, thus affording greater uniformity and higher efficiency in the vaporizing portion, I fill or partially fill the reservoir 20, which can be readily accomplished by lifting it out and positioning the same with either open tube 24 or 25 under a faucet, then apply the reservoir upside down to the support afforded by the member 14 and arms 16. During this inverting action a small amount of water will flow out, or the finger can be held over the opening 25 only, thus preventing much, if any, water from escaping. Even should it escape, it will flow over the relatively large opening afforded by the member 14 without materially disturbing the level therein, and consequently without seriously changing the level in the vaporizing portion. Once in position the liquid is continually, easily and uniformly fed by a vacuum or barometric feed, as will be readily appreciated. As soon as the liquid level 30 falls slightly below the opening afforded by the V-shaped slot 28 in the tube 24, air will flow therethrough into the top of the reservoir 20 and permit a corresponding amount of liquid to flow out of the tube 25, thus maintaining the water level 30 substantially in a predetermined position. I find that the V-shaped slot 28 is most desirable in regulating, automatically, a uniform flow, and preventing a large bubble of air getting suddenly into the reservoir 20 and permitting a correspondingly large amount of water to flow therefrom and to materially raise the water level. As already noted, the large area afforded by the member 14 requires a considerable amount of water to materially raise the level and the smaller tube 25, compared with the larger air inlet 24, still further acts to control, a smooth, uniform, non-erratic and non-bubbling flow from the reservoir 20 to the open container, provided by the member 20, hollow support 12, passage 10 and vaporizing portion of the apparatus.

I have explained the heating cartridge 50 as being preferably fitted within a surrounding and protecting tube 49, but it will be appreciated that a heating device can be supplied directly therethrough, and the entire cartridge formed as a removable and hence easily renewable member. In order to facilitate the water-tight joint feature I prefer to fit in the tube 49 permanently and leave the heating element removable therefrom. The reservoir automatically seals itself as soon as it is positioned and the water level reaches the top of the V-shaped slot 28 and no further attention need be given the same.

The compactness and portability of my present humidifying unit as well as the simple and strong construction enable the same to be marketed at a suitable price for household and individual use, whereas, prior to my inventions, humidifying apparatus have involved vast expense and mechanism and were only possible of installation in large factories. My invention being directed to an economical, inexpensive, and preferably portable and complete unit, capable of household and individual use, has for its object an entirely new field and purpose. To this end the very important feature of having the relatively large and preferably automatic liquid supply in combination with a relatively small vaporizing chamber in order to permit the vaporizing means, i. e., heating means, to be employed, which will make the expense of operation a negligible item, are important characteristics, and distinct novelties in this particular art, and therefore are claimed broadly herein. While I have illustrated an electrical heating member as the vaporizing means, I believe that my invention of a large liquid reservoir, automatic feed therefrom and constant level flow to a relatively small vaporizing chamber or portion, presents a new and novel combination irrespective of the heating means, and therefore I wish to claim same broadly, and am not limited to an electric heating element, as gas, oil, steam or the like may, of course, be substituted for the electrical heater, while still carrying out my invention.

I also contemplate the combination with my humidifying unit of automatic hydrostatic controls to regulate heat supplied and consequently the humidity diffused, and the length of working operation of the device. Control of the electric current of course controls the heat and this in turn controls the humidity diffused, the liquid consumed and consequently the flow of liquid from the tank 20 to the water level container and controlling portions, as well as to the vaporizing part of the apparatus. The various novel features, advantages, constructions, and arrangement of parts herein illustrated and explained, are believed to be broadly novel and patentable, particularly the combination of automatic means for level maintenance in connection with a further liquid supply, in an apparatus of this kind; the position and arrangement of the splash cup and its function; the automatic safety feature permitting air current insulation in case the liquid is exhausted; the removability and interchangeability of the heating unit independently of disturbing or removing the water supply and the capacity for filling and adjusting the supply independently of disturbing the heating unit; the various details for preventing undue disturbance in the water level and excessive bubbling in the evaporating chamber; as well as other features and combinations as hereinafter specified in the claims.

The combination in humidifying apparatus of the kind described, of a plurality of liquid feeding methods, specifically exemplified by the barometric feed from the large supply tank, and a gravity feeding provided by the hollow members 12 and 33 and the passage 10, resulting in maintaining an efficient and substantially predetermined water level, is believed to be new, and is therefore claimed broadly herein.

My invention is further described and defined in the form of claims as follows:

1. Humidifying apparatus, comprising a vaporizing receptacle wherein a substantially constant liquid level is maintained, a liquid supplying reservoir larger than said vaporizing chamber and having a corresponding liquid level, and automatic liquid supplying connections to said larger receptacle, permitting liquid supply thereto without materially disturbing the maintained liquid level in the vaporizing receptacle, in combination with removable electrical heating means and heat insulation means for said vaporizing chamber.

2. Humidifying apparatus of the kind described, comprising a base having a cored passage therethrough, openings at each end of said cored passage, one opening extending upwardly to afford a water containing receptacle, a removable reservoir fitted in combination with said receptacle and adapted to refill the receptacle by barometric feed, a steam generating receptacle of relatively small capacity, opening from the other end of said passage, heat insulation means therefor and an electric heating element in connection therewith, whereby a constant water level is maintained in the heating receptacle.

3. A portable humidifying apparatus of the kind described, comprising a base having a cored passage therethrough, openings at each end of said cored passage, one opening extending upwardly to afford a water containing receptacle, a removable reservoir fitted in combination with said receptacle and adapted to refill the receptacle by barometric feed, a steam generating receptacle of relatively small capacity, opening from the other end of said passage, heat insulation means therefor and an electric heating element in connection therewith, whereby a constant water level is maintained in the heating receptacle.

4. Apparatus adapted to provide an automatic transfer of liquid from a sealed receptacle into an open receptacle, by barometric feed, having means to insure uniform flow during said transfer, said means consisting in a projecting tube from the sealed member having its open mouth below the liquid level in the open member, and an air admitting slot extending from the mouth of the projecting tube to adjacent the liquid level.

5. An electrically heated humidifying apparatus comprising an electrical heating unit, liquid supply therefor, an automatic means instantly operable upon exhaustion of the liquid supply for air insulation on the heating element.

6. Electrically heated humidifying apparatus including a series of relatively large liquid supply, means conducting said liquid to the heating element, and automatic safety means creating an air insulating current around said heating element upon discontinuance of the liquid supply.

7. Electrically heated apparatus comprising a heating element, insulating means for said heating element confining the transfer of heat therefrom to a predetermined space, means affording a liquid supply to said space, said means automatically permitting air supply to said space upon exhaustion of the liquid therein.

8. Humidifying apparatus of the kind described, comprising an evaporating chamber, a heating element adapted to be positioned substantially centrally of said chamber, said chamber having an open top and bottom whereby a free flow of either liquid or air may enter at the open bottom and escape from the top and surround the heating element as provided.

9. Humidifying apparatus of the kind described, comprising a liquid supply reservoir, an evaporating receptacle, means to cause a regulated flow from said reservoir to said receptacle, means effecting the artificial vaporizing of the liquid in said receptacle, and air-tight connections from said supply reservoir to the receptacle independent of couplings, packing joints, threaded connections or the like.

10. Humidifying apparatus of the kind described, comprising a removable liquid supply reservoir, an evaporating receptacle, means to cause a regulated flow from said reservoir to said receptacle, means effecting the artificial vaporizing of the liquid in said receptacle, and air-tight connections from said supply reservoir to the receptacle independent of couplings, packing joints, threaded connections or the like, whereby removal and replacement of the supply reservoir is effected with an air-tight seal producing barometric feed by the mere lifting of the receptacle for removing it and the action of replacing it in position when full.

11. Humidifying apparatus of the kind described, comprising a removable liquid supply reservoir, an evaporating receptacle, means to cause a regulated flow from said reservoir to said receptacle, means effecting the artificial vaporizing of the liquid in said receptacle, and air-tight connections from said supply reservoir to the receptacle independent of couplings, packing joints, threaded connections or the like, said apparatus being constructed and arranged to maintain a substantially predetermined liquid level during the removal and replacement of the supply reservoir.

12. Humidifying apparatus of the kind described, comprising separable portions, one constituting a liquid supply, and the other consisting in a vaporizing receptacle, cooperating means for uniting the two members independently of couplings, packings or the like, and a removable heating unit, said supply reservoir and the heating unit being separately removable independently of the connections for said removable members.

13. Portable humidifying apparatus, comprising a fixed vaporizing receptacle, means therein permitting a substantially constant liquid level to be maintained, removable heating means adjacent the liquid in said vaporizing portion, connections therefor permitting removal and replacement of the heating unit independent of disturbing the liquid level, in combination with a removable liquid supply reservoir constructed and arranged for barometric feed, and means connecting the removable supply reservoir independently of couplings, conduits or the like.

14. Humidifying apparatus of the kind described, comprising means affording a plurality of liquid evaporating surfaces, and means permitting normal evaporation at one surface and affording artificial evaporation at another surface.

15. Humidifying apparatus of the kind described, having a plurality of liquid evaporating surfaces operable at different temperatures.

16. Humidifying apparatus of the kind described, having a plurality of liquid evaporating surfaces operable at different temperatures, in combination with liquid supplying means to maintain said plurality of surfaces at substantially predetermined level.

17. Humidifying apparatus of the kind described, having a plurality of liquid evaporating surfaces operable at different temperatures, in combination with liquid supplying means automatically operable to compensate for the varying evaporations of each surface and to maintain the same at substantially predetermined level.

In testimony whereof, I have signed my name to this specification.

OLIVER D. HOGUE.